United States Patent
Schumann et al.

(10) Patent No.: US 6,173,859 B1
(45) Date of Patent: Jan. 16, 2001

(54) FILTER HOUSING WITH IRREGULAR RIB

(75) Inventors: Heiko Schumann; Volker Renner, both of Münster (DE)

(73) Assignee: Ing. Walter Hengst GmbH & Co. KG, Münster (DE)

(*) Notice: Under 35 U.S.C. 154(b), the term of this patent shall be extended for 0 days.

(21) Appl. No.: 09/194,744

(22) PCT Filed: Jun. 6, 1997

(86) PCT No.: PCT/DE97/01198

§ 371 Date: May 10, 1999

§ 102(e) Date: May 10, 1999

(87) PCT Pub. No.: WO97/47371

PCT Pub. Date: Dec. 18, 1997

(30) Foreign Application Priority Data

Jun. 11, 1996 (DE) ............................................. 196 23 190

(51) Int. Cl.⁷ ........................................................ B65D 6/38
(52) U.S. Cl. .......................... 220/672; 220/675; 210/435; 210/DIG. 17
(58) Field of Search ...................... 210/435, DIG. 17, 210/450, 186, 443; 184/6.24; 123/196 A, 196 CP, 198 P; 220/672, 675

(56) References Cited

U.S. PATENT DOCUMENTS

| | | | |
|---|---|---|---|
| 2,207,399 | * 7/1940 | Gaertner | 210/435 |
| 2,997,180 | 8/1961 | Loveday | 210/436 |
| 3,333,703 | * 8/1967 | Scavuzzo et al. | 210/DIG. 14 |
| 4,336,042 | 6/1982 | Frantz et al. | 55/387 |
| 4,834,885 | * 5/1989 | Misgen et al. | 210/440 |

FOREIGN PATENT DOCUMENTS

| | | |
|---|---|---|
| 2831070A1 | 2/1979 | (DE) . |
| 3216395A1 | 11/1983 | (DE) . |
| 4344588A1 | 6/1995 | (DE) . |
| 0 634 203 A2 | 1/1995 | (EP) . |
| 1 395 788 | 5/1975 | (GB) . |

* cited by examiner

Primary Examiner—Joseph W. Drodge
Assistant Examiner—Marianne Ocampo
(74) Attorney, Agent, or Firm—Lahive & Cockfield, LLP; Anthony A. Laurentano

(57) ABSTRACT

A filter housing has a pot-like base, a lid that closes the base in a pressure-tight manner, one or several additional elements such as pipes, flanges or the like, which are connected to the wall of the base in the area of the seal between base and lid, and at least one rib which extends radially around the base in this area. The rib has varying dimensions around the circumference of the base and a reduced cross-section in the area in which the additional elements are connected to a wall of the base. The lid and base are directly screwed together by means of matching threads and the variable cross-section of the rib ensures a practically identical rigidity of the base against inner pressure stresses all around its circumference.

6 Claims, 2 Drawing Sheets

FILTER HOUSING WITH IRREGULAR RIB

BACKGROUND OF THE INVENTION

The invention relates to a fuel filter housing for use with an automobile.

It is known from automobile construction for example, specifically in the field of fuel filters, to make the pot-shaped base of the filter housing from plastic. Lower manufacturing costs and weight savings are realized by contrast with the conventional metallic filter housings previously used. The lid is usually made in the form of a screw connection and is screwed directly to the base without any additional screws or the like, with the base and lid having matching external and internal threads.

Depending on the operating pressure that prevails in the filter housings and depending on the temperatures that prevail in the environment of the filter, the dimensional stability of the plastics used can decrease, causing deformation and hence a slight expansion of the base. The base can be reinforced areawise radially by the additional structural elements provided, such as flanges, connections, and the like, so that the expansion of the base takes place nonuniformly and therefore leads to out-of-roundness of the base with a basically round base cross section- As a result, the tightness between the base and the lid can be adversely affected.

It is known that reinforcements in the form of tensioning rings can be provided externally on the base in the sealing area of the base and lid. The term "sealing area" refers to the zone in which the reinforcements may be located and thus influence the rigidity of the base at the point where it is sealed off from the lid. These sleeve-like reinforcements in the form of tensioning rings increase the assembly costs for the filter housing. In addition, such sleeves fit uniformly around the circumference of the base so that the forces arising from inside, because of the partial reinforcement of the base by means of the other parts such as the flange, connections, and the like, can still produce an out-of-roundness of the base that is slightly reduced by the reinforcing measure.

Other reinforcing measures can consist in inserting reinforcing rings into the housing wall of the base, but these inserts result in higher production costs and can conceal the danger of material impurities or nonuniformity that can be disadvantageous for the recyclability of the filter housing.

A housing according to the species is known from DE-OS 28 31 070 (FIG. 6). A lid with corners is provided on a round base. The base has a circumferential rib in its uppermost area close to the lid, said rib following the contour of the lid. Projections relative to the base result at the corners so that screws can be provided there to join the lid to the base, since the lid itself is not designed as a screw closure.

Connecting stubs terminate in the base close to and below the circumferential rib on two opposite sides. When the rib follows the contour of the lid, a circumferential rib has a reduced cross section not only above the connecting stub, but also at other points opposite the round base, so that the intrinsic stiffness of the base relative to pressure stresses arising from inside is not uniform around the circumference. As a result, depending on the choice of material and the wall thickness of the base, fluid leaks between the base and lid can result.

SUMMARY OF THE INVENTION

The goal of the invention is to permit a good contour stability of the base in its sealing area with means that are as simple as possible, thus permitting a good tightness of the filter housing and permitting an economical manufacture of the filter housing.

The present invention proposes providing one or more circumferential ribs on the base of the filter housing sealing area between the base and the lid, so that a stiffening of the base takes place in a zone that reinforces the contour stability of the housing at the point where the seal is produced between the base and the lid. Thus, an expansion of the base is opposed at the point where the tightness of the connection between the base and the lid is important. The provision of one or more ribs therefore does not serve to provide anchoring surfaces to receive screws as is the case in the housing constituting the species. Instead it allows economical design of a thin-walled housing which can be flexible areawise throughout during operation, but which is dimensionally stable at the points where the seal is produced between the lid and the base and thus prevents leaks.

By means of the basic stiffening of the base in this sealing area, which is achieved by the rib, according to the invention a retention of the specified contour of the base is produced that is as exact as possible, with the circumferential rib having a varying cross section and being weaker at those points where partial stiffening of the base is provided by the other elements that abut the base wall. The reinforcing effect of these additional parts and of the rib is supplemented radially around the base in such fashion that when the base is subjected to pressure, it opposes this pressure in the sealing area between the base and the lid with a resistance that is nearly the same all around the circumference, and therefore remains dimensionally stable.

A difference in rib cross section that is especially simple to manufacture can be achieved by the rib extending for various distances from the wall of the base and being brought closer to the wall at those points where the other parts abut the base wall.

According to the invention, the rib is not required to surround the base completely or to run completely around the base. Depending on the thickness of the rib and its reinforcing effect on the wall of the base, therefore, provision can be made such that the rib penetrates the base wall at those points where other parts abut the base wall, i.e. the length of the rib at this point returns to zero.

Since a screw connection is provided between the lid and the base, several ribs can advantageously be provided to produce a stiffening of the base that is as uniform as possible around the entire thread area, and to guarantee the tightness of the connection between the base and the lid in this fashion. By providing several ribs, optimum rigidity adaptation for compensation of the partial stiffening by the other structural elements can occur, so that a very exact contour retention of the base in the sealing area is accomplished not only radially but axially as well.

Surprisingly, tests have shown that the contour stability of the base can also be reinforced by the rib being weakened not only at those points where the other structural elements abut the base wall, but also where the base wall is free of such shaped structural elements. With the aid of such further or additional cross-sectional reductions that can be made until the rib cross section is reduced to zero, in other words until the rib breaks, a fine tuning is possible for example by which the final differences between the desired contour pattern of the base can be corrected that could result under the operating conditions of the filter.

The areas whose cross sections have been reduced in this fashion can be provided offset by an angle of several degrees, 10° for example, up to the diametrically opposite position, in other words at an angle of 180°, with the ideal position and ideal size of the cross sectional reduction being determined especially with the aid of modern computers in order to determine this fine adjustment of the contour pattern of the base.

BRIEF DESCRIPTION OF THE DRAWINGS

One embodiment of the invention will be described in greater detail with reference to the drawings.

DESCRIPTION OF ILLUSTRATED EMBODIMENTS

Figure 1:
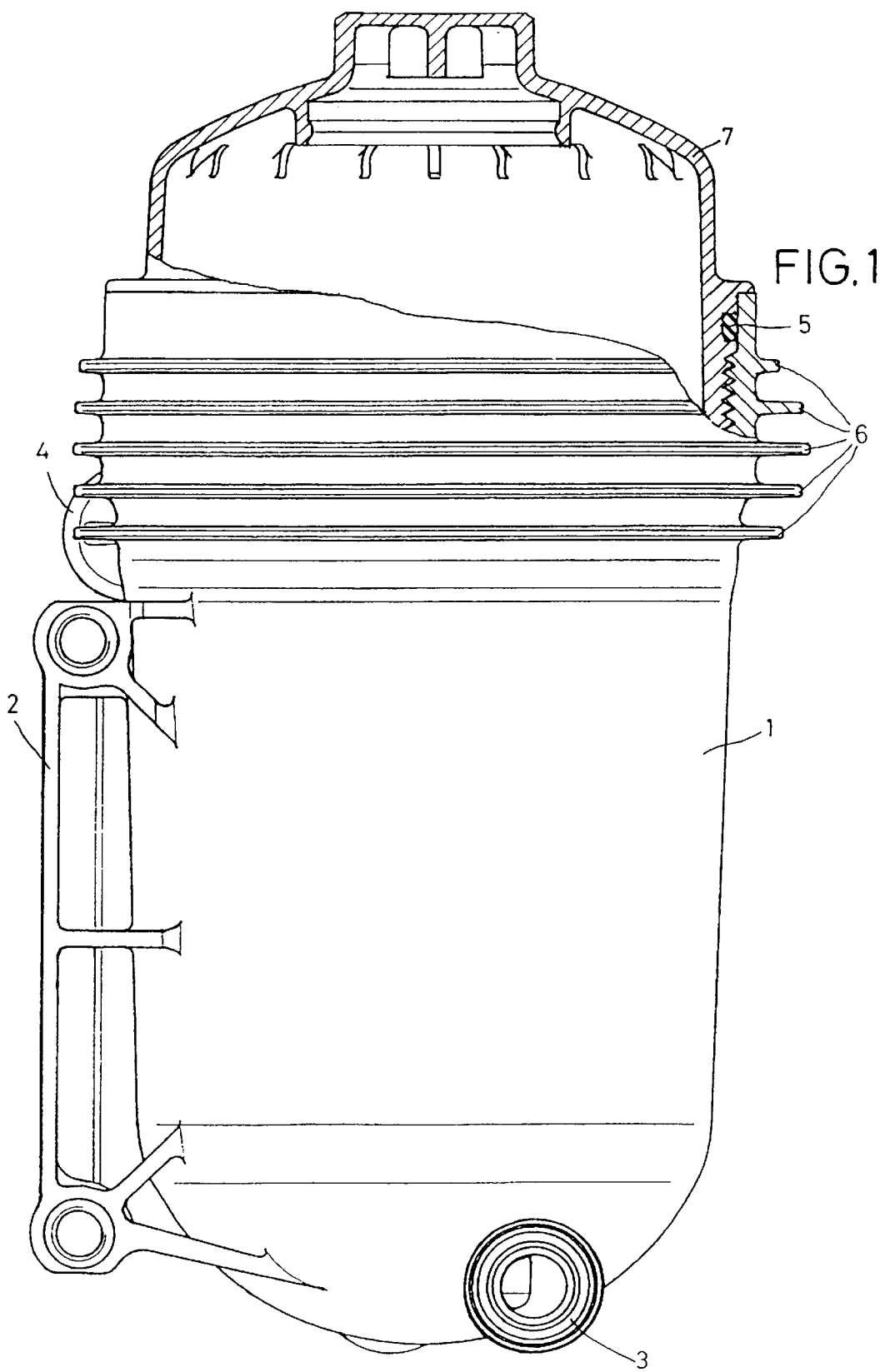
FIG. 1 is a side view of a fuel filter housing partially broken away.

In FIG. 1, 1 refers to the pot-shaped base of a filter housing, which can be the housing of a fuel filter. Base 1 has a molded support 2 for fastening the fuel filter to a vehicle, in the engine compartment for example. In addition, base 1 has connecting stubs 3 and 4 that serve to supply and remove the fuel. Base 1 can be sealed by a lid 7 at its upper end, with lid 7 being designed as a screw connection and having a thread that cooperates with a matching thread in base 1.

The seal between base 1 and lid 7 can be produced by the two threads themselves or advantageously by an additional seal 5, designed as an O-ring for example.

The area of socket 1 is designated a sealing area whose deformation has an influence on the tightness of seal 5 and can adversely affect this seal. Support 2 as well as connecting stubs 3 and 4 are structural elements that are manufactured in one piece together with base 1 and are formed on the base wall. The connecting stubs 4 and possibly also support 2 terminate in the sealing area, or at least in the vicinity of the sealing area, in the wall of the base so that they can influence the rigidity and dimensional stability of base 1 in the sealing area.

Figure 2:
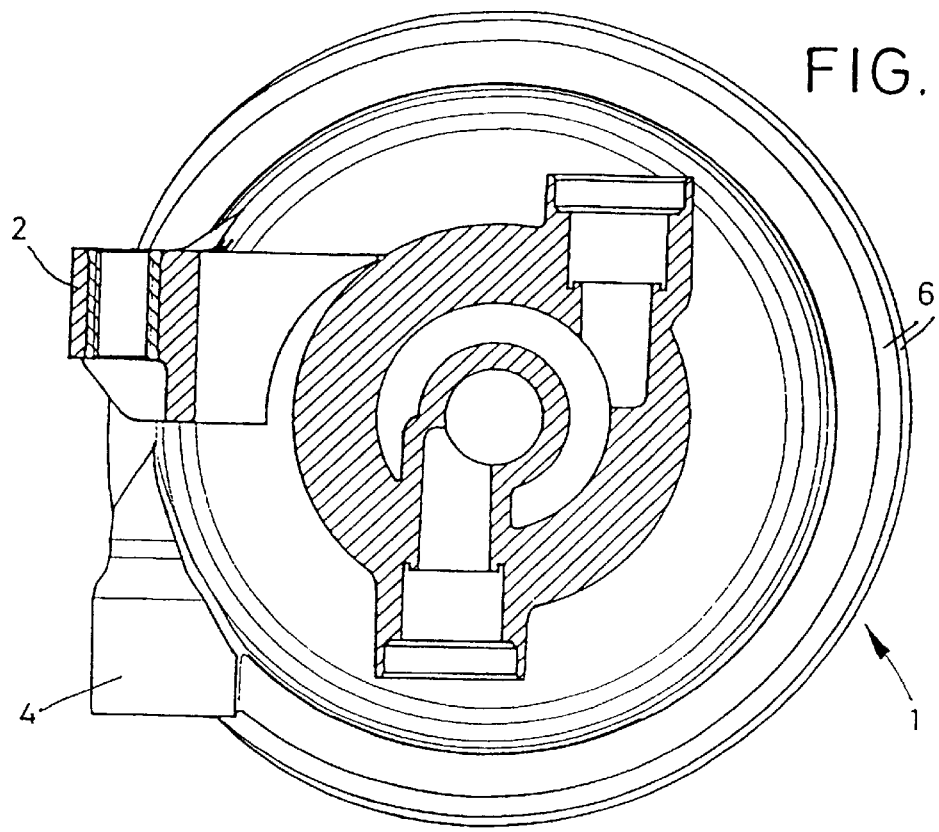
FIG. 2 is a horizontal section through the housing in FIG. 1 looking upward.

As is clear from FIG. 2, upper connecting stub 4 does not terminate radially in the base wall but extends tangentially into the wall of base 1.

Figure 3:
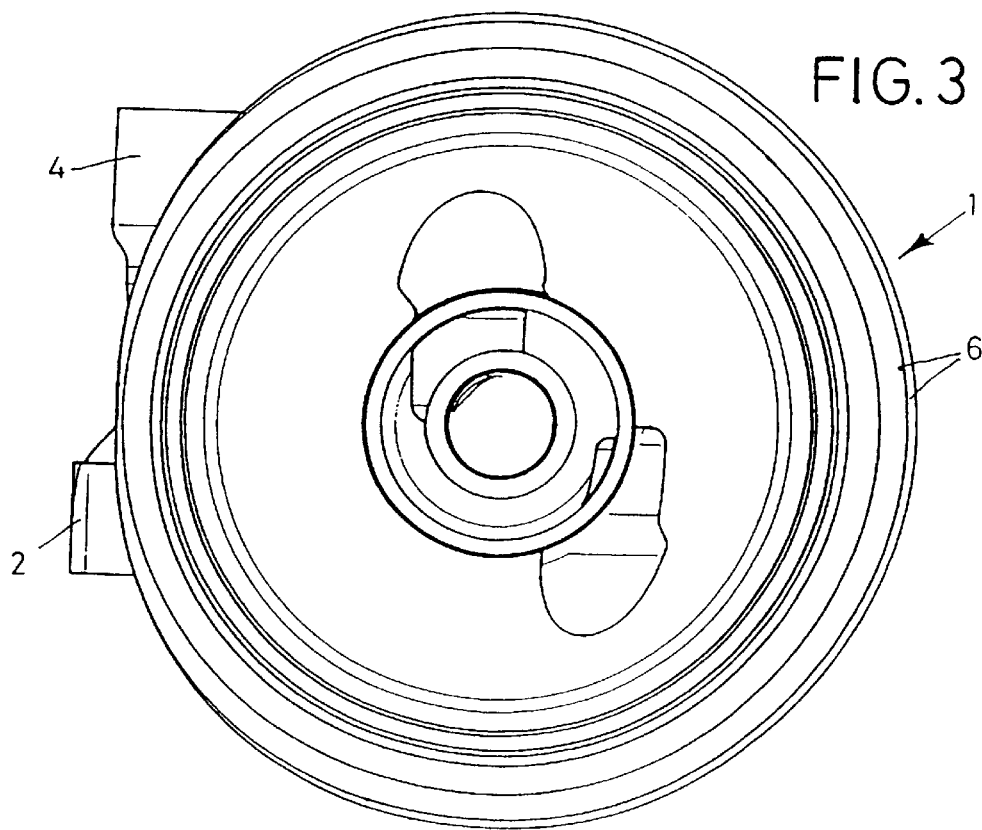
FIG. 3 is a top view of the base in FIGS. 1 and 2 with the lid removed.

As can be seen from the two views mentioned as well as FIG. 3, base 1 has five ribs 6 in the sealing area between base 1 and lid 7. Ribs 6 extend outward radially from the wall of base 1 across the circumference of ribs 6 for different distances. At places where partial reinforcement of base 1 is produced by support 2 and connecting stub 4, ribs 6 have a smaller cross section and thus produce a reduced stiffening of base 1 by comparison with the other circumferential areas in which ribs 6 are molded on base 1.

In this manner, by means of ribs 6 on the one hand and the additional structural elements in the form of support 2 and connecting stub 4 on the other, a stiffening of the base in the vicinity of the seal with lid 7 is produced around the circumference of base 1 so that in the event of a pressure stress developing internally, the circular contour of base 1 is retained and the seal between base 1 and lid 7 is preserved.

Corresponding to the cross-sectional contour of a base that can deviate from the circular shape, shown merely as an example, and corresponding to the number, size, and arrangement of the structural elements connecting to the base wall, the ribs provided can be designed differently according to the invention from the embodiment shown. In addition, likewise in contrast to the embodiment shown, the ribs do run radially around the base, but not completely, only areawise. Furthermore, in contrast to the embodiment shown, provision can be made such that the reinforcing effect of the ribs is not produced by their different radial dimensions but by their thickness or by other geometric changes.

What is claimed is:

1. A housing for a filter, comprising
a pot-shaped base having an outer wall,
a lid that seals the base in a pressure-tight manner,
one or more structural elements that abut the base wall in the vicinity of the seal formed between the base and the lid when assembled, and
at least one rib formed on the wall of the base and running radially about the base-in the vicinity of the seal, said rib being nonuniform in size along the circumference of the base, and the rib having a reduced cross section in the area in which the structural elements abut the base wall,
wherein the lid and the base are screwed directly to one another by matching threads when assembled, such that the cross-sectional change in the rib is adapted to produce a nearly constant circumferential rigidity of the base against any pressure stress that develops internally within the base.

2. The housing according to claim 1, wherein said rib has the same thickness along the circumference of the base in the vicinity of the structural elements, but a reduced radial length from the base wall.

3. The housing according to claim 2, wherein said rib has one or more areas on the circumference with reduced cross sections in the vicinity of the seal between the base and the lid, at some points close to the location of the where the base wall is free of the structural elements.

4. The housing according to claim 1, wherein said rib has one or more areas on the circumference with reduced cross-sections in the vicinity of the seal region formed between the base and the lid, at the some points close to the location of the structural elements where the base wall is free of the structural elements.

5. A filter housing suitable for use with a fuel filter for an automobile, comprising
a base having a wall and a lid configured for threaded engagement with the base,
one or more structural elements positioned to abut the base wall in a seal region formed between the base and the lid when assembled, and
at least one rib formed on the wall of the base and extending radially about the base in the seal region, said rib being nonuniform in size along the circumference of the base and having a reduced cross section in the area in which the structural elements abut the base wall, said rib having substantially the same thickness along the circumference of the base and a reduced radial length relative to the base wall in the vicinity of the structural elements,
wherein the cross-sectional change in the rib produces a nearly constant circumferential rigidity of the base against any pressure stress that develops within the base when the lid and the base are screwed to one another.

6. A housing for a filler, comprising
a pot-shaped base having an outer wall,
a lid that seals the base in a pressure-tight manner, one or more structural elements that abut the base wall in the vicinity of the seal formed between the base and the lid when assembled, and at least one rib formed on the wall of the base and running radially about the base in the vicinity of the seal, said rib being non-uniform in size along the circumference of the base and having a reduced cross section in the area in which the structural elements abut the base wall, said rib having the same thickness along the circumference of the base in the vicinity of the structural elements, but a reduced radial length from the base wall, said rib having one or more areas on the circumference with reduced cross sections in the vicinity of the seal between the base and the lid at some points close to the location of the structural elements where the base wall is free of the structural elements, wherein the lid and the base are screwed directly to one another by matching threads when assembled, such that the cross-sectional change in the rib is adapted to produce a nearly constant circumferential rigidity of the base against any pressure stress that develops internally within the base.

* * * * *